United States Patent
Wu et al.

(10) Patent No.: US 9,756,248 B1
(45) Date of Patent: Sep. 5, 2017

(54) METHODS AND SYSTEMS FOR CAMERA DRIFT CORRECTION

(71) Applicant: Xerox Corporation, Norwalk, CT (US)

(72) Inventors: Hao Wu, Pittsford, NY (US); Howard Mizes, Pittsford, NY (US); Wencheng Wu, Rochester, NY (US); Graham Pennington, Webster, NY (US); Rakesh Kulkarni, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/058,660

(22) Filed: Mar. 2, 2016

(51) Int. Cl.
| | |
|---|---|
| *H04N 5/235* | (2006.01) |
| *H04N 5/232* | (2006.01) |
| *G06K 9/00* | (2006.01) |
| *G06T 7/00* | (2017.01) |

(52) U.S. Cl.
CPC ..... *H04N 5/23254* (2013.01); *G06K 9/00765* (2013.01); *G06T 7/003* (2013.01); *G06T 7/0018* (2013.01); *H04N 5/23267* (2013.01)

(58) Field of Classification Search
CPC ................................................. H04N 5/23261
See application file for complete search history.

(56) References Cited

U.S. PATENT DOCUMENTS

| | | |
|---|---|---|
| 6,130,912 A | 10/2000 | Chang et al. |
| 8,384,787 B2 | 2/2013 | Wu |
| 2006/0274156 A1 | 12/2006 | Rabbani et al. |
| 2012/0162454 A1 | 6/2012 | Park et al. |

OTHER PUBLICATIONS

Nagaraju, N. et al., "Image Registration Using Scale Invariant Feature Transform," International Journal of Scientific Engineering and Technology Jul. 1, 2013, 2(7):675-680.
Brown, L. G., "A Survey of Image Registration Techniques," ACM Computing Surveys (1992) 24(4):325-376.

*Primary Examiner* — Gary C Vieaux
(74) *Attorney, Agent, or Firm* — Kevin Soules; Luis M. Ortiz; Kermit D. Lopez

(57) ABSTRACT

A method, system, and apparatus for video frame alignment comprises collecting video data comprising at least two video frames; extracting a line profile along at least one line profile in each of the at least two video frames; selecting one of the at least two video frames as a reference video frame; segmenting each of the at least one line profiles into a plurality of segmented line profile group segments; aligning the plurality of segmented line profiles with the segmented line profiles in the reference video frame; translating each of the at least two video frames for each of the plurality of corresponding segmented line profile alignments; and removing a camera shift from the at least two video frames according to the translation and alignment of the plurality of segmented line profiles with the plurality of segmented line profile in the reference video frame.

20 Claims, 7 Drawing Sheets

METHODS AND SYSTEMS FOR CAMERA DRIFT CORRECTION

FIELD OF THE INVENTION

Embodiments are generally related to the field of imaging. Embodiments are also related to the field of cameras and data capture. Embodiments are further related to methods and systems for correcting camera drift and aligning video frames.

BACKGROUND

Smart parking management plays an important role in Smart City technology. Smart parking management can reduce traffic congestion. Video sensing is an aspect of smart parking technology that enables more flexible, as well as extensible, solutions compared to in-ground metal sensors or ultrasonic sensors.

One problem with smart parking technology is that cameras often experience slow or sudden drift or shifting. Slow drift is defined as movement over the course of a day, whereas sudden drift occurs on time scales of a few minutes up to an hour. The camera drift problem significantly degrades the performance of video analytics (extraction) systems. Such drift may result from a number of factors including the camera not being correctly mounted, movement after recording starts, wind, occlusion, etc.

The region of interest (ROI) is the section of the image that captures the blockface and vehicles parked along the blockface. Successful application of computer vision vehicle detection algorithms to determine the occupancy of parked vehicles in the ROI requires that the region remains in the same location throughout the duration of the video. Drift can cause the location of the region of interest to vary from frame to frame. Thus, it is critical to correct the camera drift before further processing. Some of the hardware based solutions to this problem include the use of guide wires or other tightening means. However, these are prone to operator error, may degrade overtime, and make the workflow cumbersome.

There are several prior art solutions for video stabilization including feature point tracking, interest point tracking, and image-based registration. However, such video stabilization algorithms are often very slow and therefore not sufficient for applications that require analysis of large amounts of data quickly. In addition, such algorithms are not sufficiently robust to changes in illumination, movement, and other such factors. Accordingly, a need exists for improved methods and systems that correct camera drift.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for video collection.

It is another aspect of the disclosed embodiments to provide a method and system for camera drift or camera shift correction.

It is another aspect of the disclosed embodiments to provide a method and system for drift correction in video associated with smart parking applications.

It is yet another aspect of the disclosed embodiments to provide an enhanced method and system for correcting camera drift in video data.

In an embodiment, a method for shift or drift (the terms "shift" and "drift" can be understood to mean the same thing and are used interchangeably throughout) correction includes acquiring a temporal sequence of image frames (i.e., a video sequence); identifying multiple lines in the image frames in order to extract line profiles along the line paths; optionally, stacking the line profiles from desired frames to form multiple spatiotemporal (ST) images, respectively; identifying a reference frame/time; segmenting each identified line profile (which correspond, for example, to ST image rows) into multiple line profile group segments; performing registration between the line profile group segments from the desired frame/time and their correspondence to the selected reference frame/time; calculating the overall horizontal and vertical camera drift information from the registration information between all segments; and applying the obtained drift information to the original sequence of image frames or video to remove the unwanted drift in the data.

The aforementioned aspects and other objectives and advantages can now be achieved as described herein. A method, system, and apparatus for video frame alignment comprises collecting video data comprising at least two video frames; extracting a line profile along at least one line path in each of the at least two video frames; selecting one of the at least two video frames as a reference video frame; aligning at least one of the at least one line profiles with the line profile in the reference video frame; translating each of the at least two video frames according to the corresponding line profile alignments; and removing a camera shift from the at least two video frames according to the translation and alignment of the at least one of the at least one line profiles with the line profile in the reference video frame.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or," as used herein may include a variety of meanings that may depend, at least in part, upon the context in which such terms are used. Typically, "or" if used to associate a list, such as A, B or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
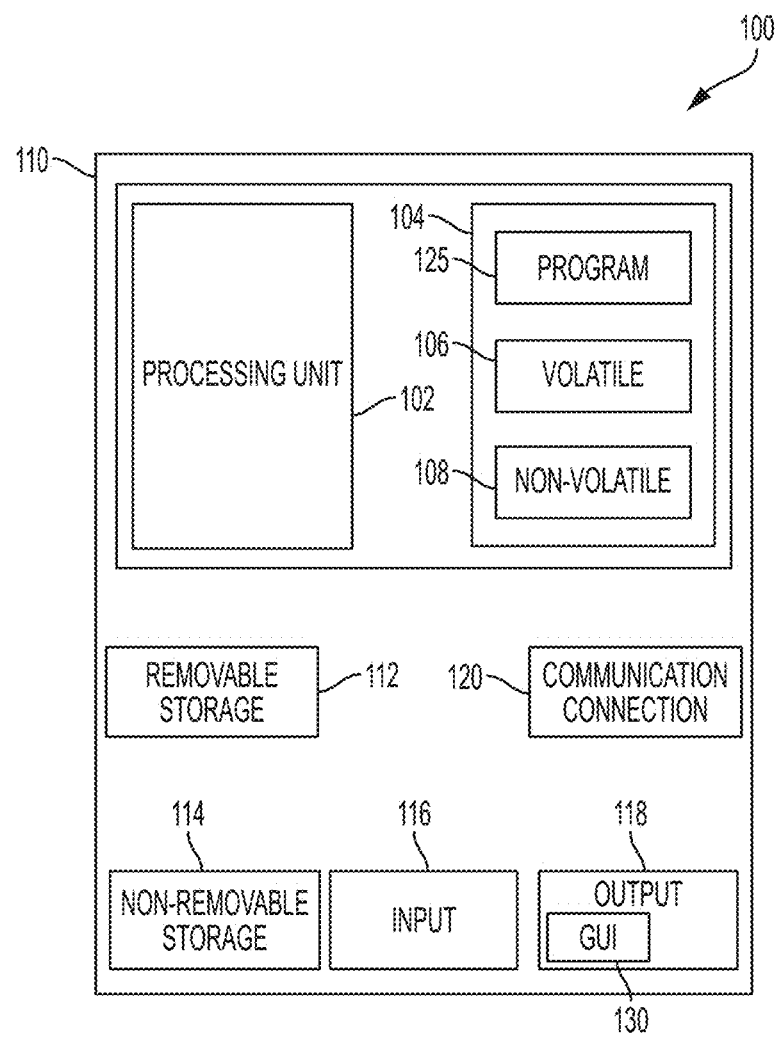
FIG. 1 depicts a block diagram of a computer system which is implemented in accordance with the disclosed embodiments.
Figure 2:
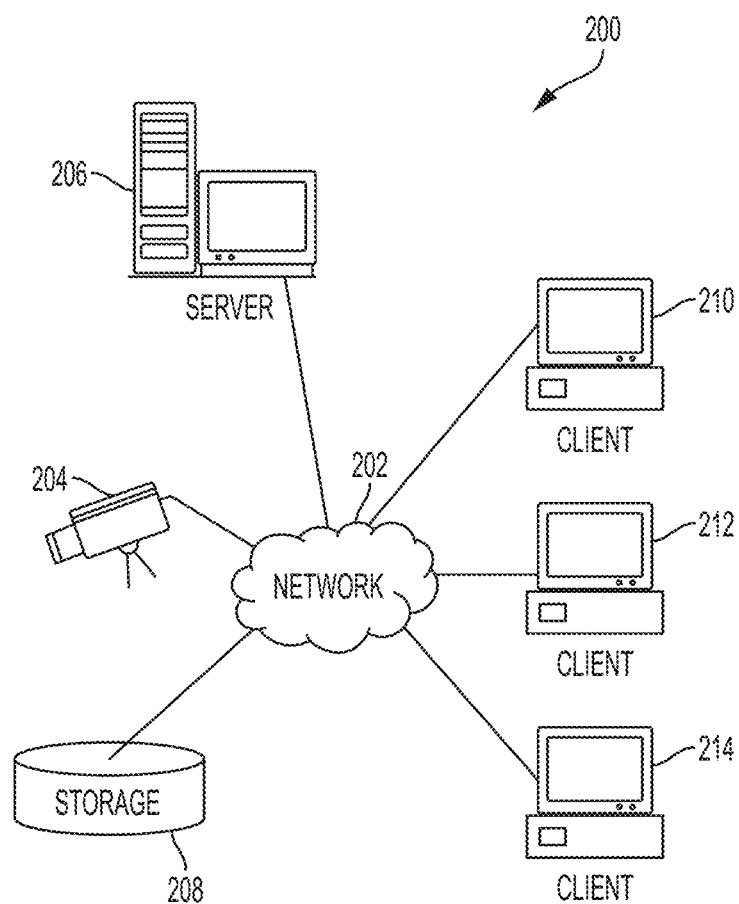
FIG. 2 depicts a graphical representation of a network of data-processing devices in which aspects of the present invention may be implemented.
Figure 3:
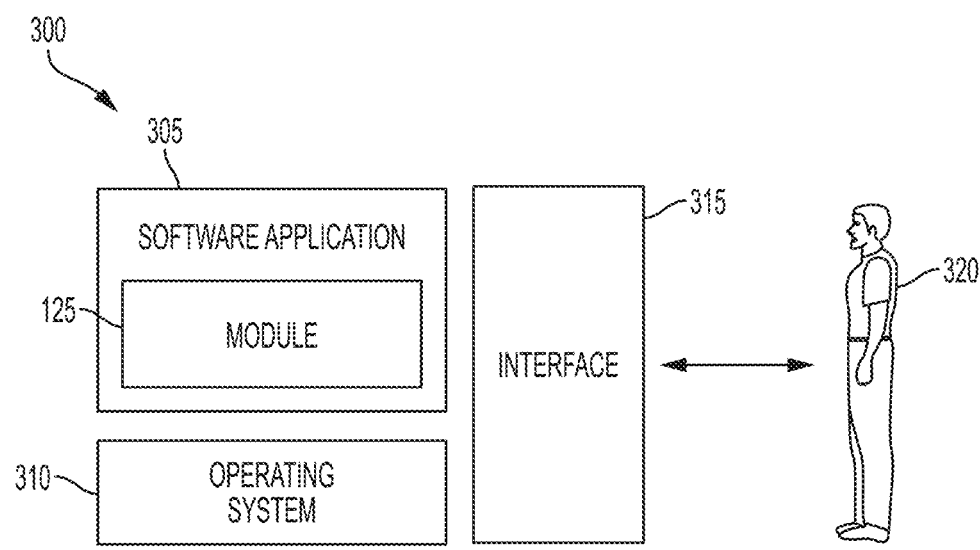
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN) or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The embodiments disclosed herein can be applied to a broad set of applications where camera shift needs to be removed before further processing can be completed. Camera drift can be encountered in any imaging system and is especially prevalent in outdoor applications. Exemplary systems include surveillance, traffic management, traffic enforcement and ticketing, etc. The systems and methods disclosed herein offer robustness and feasibility not previously available. The disclosed methods and systems also provide a great computational cost advantage over prior art approaches.

Among the principal challenges in shift or drift (the terms "shift" and "drift" can be understood to mean the same thing and are used interchangeably throughout) correction is the relatively large amount of video that is recorded by cameras. The state of the art computer vision algorithms for shift correction are complex and require a significant amount of processing time. These algorithms cannot perform the correction faster than new data is being collected. The volume of data becomes unmanageable quickly. For example, in many applications cameras operate 16 hours a day, 7 days a week. This amount of data alone is significant. In some cases, multiple cameras collect data in parallel, increasing the total data volume. Another principal challenge in shift correction is due to the fact that the field of view of a camera often encompasses a large portion of, for example, traffic lanes, which vehicles move through during the day. Illumination may vary significantly depending on time of day, weather, etc. Existing computer vision algorithms are not robust to the large amount of motion in an image and illumination variations.

The disclosed methods and systems provide embodiments to perform video stabilization, which is fast and designed to be robust against regions in the video that contain lots of dynamics motion. A scene may be generally understood to be any environment being monitored by a camera. In some cases, a scene of interest may be a parking garage, a parking lot, a blockface for parking, a road or highway, a toll both or tolling station, a pedestrian thoroughfare, or other such outdoor environment. The embodiments make use of a spatiotemporal method for video stabilization. The systems and methods disclosed herein include suitable image acquisition, processing, transmission, and data storage devices. In some embodiments, the hardware and software modules may be implemented on board a camera such as camera 204 in order to improve the video output provided by the camera. In other embodiments, the camera may collect data and then provide it to a computing device for drift correction.

Figure 4:
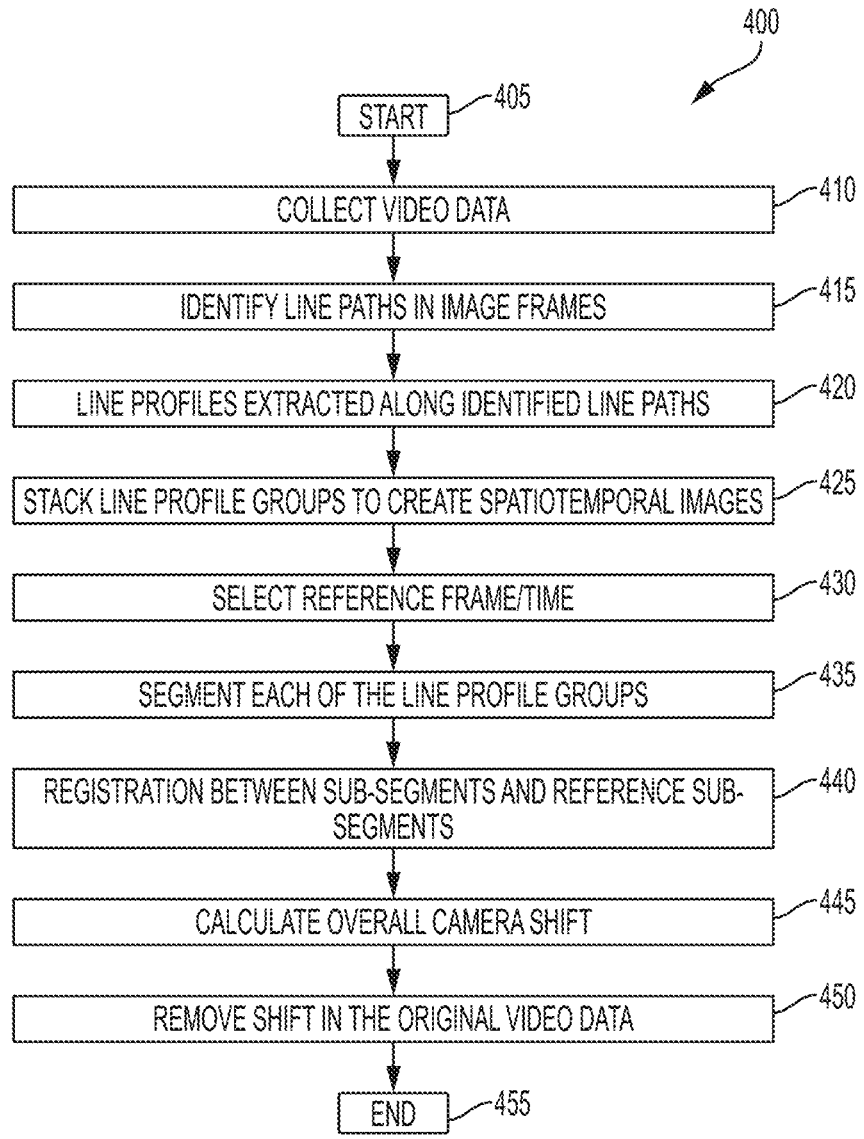
FIG. 4 depicts a flow chart illustrating logical operational steps associated with a method for aligning video frames in accordance with the disclosed embodiments.

FIG. 4 illustrates a method 400 for camera shift correction that is robust to scene dynamics and is computationally fast. The method begins at block 405.

A line path can be defined as a contiguous set of pixels that connect two endpoint pixels in an image. Line paths may be horizontal, vertical, diagonal, curved, etc., depending on the positions of the two endpoints and the collection of pixels that connect them. A line profile is defined as the sequence of image pixel values in sequence sampled from the beginning pixel of a line path to the end pixel of a line path. An image with multiple color channels can be converted to a single channel image using techniques such as a red, green, blue to gray transformation. A line profile group is defined as a set of line profiles extracted from line paths that traverse the image in a similar direction. A line profile group segment is a section of a line profile group.

At block 410, a temporal sequence of image frames (i.e., video sequence) can be collected or acquired. At block 415, multiple line paths in the image frames can be identified. The line paths may be selected to be horizontal, vertical, diagonal, curved, etc., depending on the specific application. The line paths are used as guides for the extraction of line profiles along the lines, as shown at block 420.

Block 425 illustrates an optional step wherein the line profile groups from desired frames are stacked in order to form one or more spatiotemporal images. Next, at block 430, a reference frame/time can be selected. The selection of a reference frame or time can be accomplished in a number of different ways as disclosed herein.

Once the reference frame has been established, each of the identified line profiles groups can be segmented into multiple sub-segments, as illustrated at block 435. Segmentation, as described in block 435, is not strictly required in the method 400, but will provide more robust alignment in some applications. Alignment and registration between the sub-segments from the desired frame/time and the corresponding sub-segments from the selected reference frame/time is required, as shown by block 440. At this point, a translation of each of the frames of video is completed so that the overall camera shift information can be calculated from the registration information between all segments, as illustrated at block 445. The obtained drift information is thus applied to the original sequence of image frames or video to remove the shift in the data, as shown at block 450. The method then ends at block 455.

Figure 5:
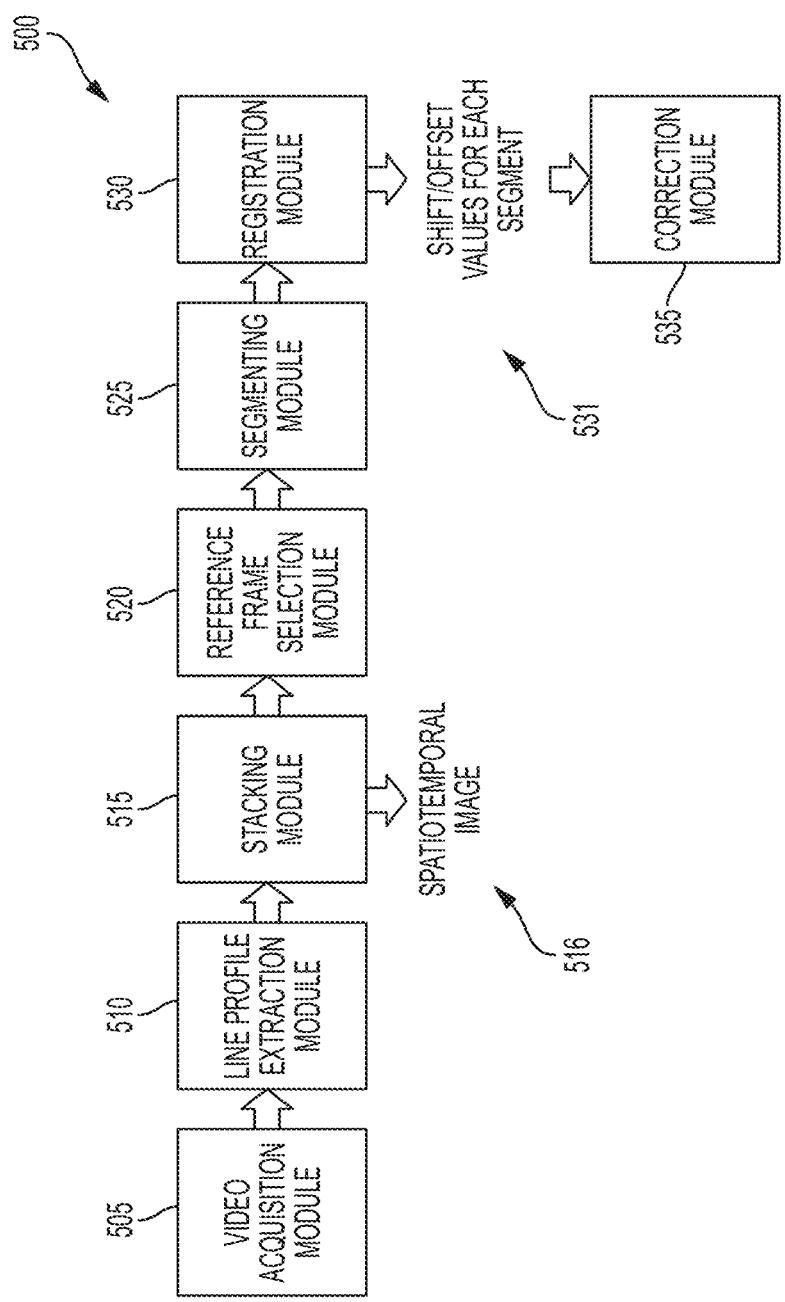
FIG. 5 depicts a block diagram of modules associated with a system and method for aligning video frames in accordance with disclosed embodiments.

FIG. 5 illustrates a system 500 for video frame alignment in accordance with an embodiment. Video acquisition module 505 is used to acquire a temporal sequence of image frames (i.e., a video sequence). It should be understood that the video frames can be acquired using any of a variety of video or still camera devices. Such cameras may collect data as RGB, Near Infrared (NIR), thermal, monochromatic, etc. Each of these may thus embody the video acquisition module 505.

Videos or image sequences collected by the video acquisition module 505 can be pre-processed for some purposes, such as noise reduction, contrast enhancement, etc. Such pre-processing is optional and may be done by the video acquisition module 505 or externally by an external computing device.

It should be understood that the image frames can be acquired directly from a video camera or other such camera, which may then be the video acquisition module. Alternatively, the image frames can be originally acquired by a camera, stored in storage, such as storage 208, and later extracted from storage for processing.

Depending on the specific requirements of a given application, the video data can be temporally sampled at a varying frame rate. The sampled frames can then be subject to processing in order to remove shift and align the frames as detailed herein. The video data may be unevenly sampled. There is no strict requirement for the frames to be a temporal sequence acquired at a fixed temporal interval. The interval may be varied according to various events, such as the beginning setup stage, bad weather conditions, day and night shifting, bandwidth capabilities of the camera, and network infrastructure.

The system 500 further includes a line profile extraction module 510 which can be used to identify line paths in the image frames along which line profiles can be extracted.

Figure 6:
FIG. 6 depicts a video frame with sampling row and sampling columns in accordance with the disclosed embodiments.

The line profile extraction module 510 is used to first identify a set of line paths in the video frames. A group of line paths can be defined by the line paths oriented in similar directions. One line path group may be evenly sampled rows. Another line path group may be evenly sampled columns. FIG. 6 illustrates a single frame of video illustrating the concept of a group of line paths. The frame of video shows horizontal sampling rows 605, and on the same single frame of video, vertical sampling columns 610. It should be understood that the line paths, and associated extracted line profiles, can be of any spatial form, such as a diagonal line or a curve, and do not need to correspond to a full row or column. The line profiles may have a width of a single pixel or may be constructed by averaging the adjacent pixels in thicker lines.

In another embodiment, more accurate shift correction can be accomplished if the paths of the line profiles correspond to the expected drift of the scene. The line profiles can be the segments of rows or columns within the identified region of interest that contain more stable background scene content. The stable regions can be manually or automatically identified as buildings and landscape where one would expect little inter-frame motion. Alternatively, heat maps of image motion throughout the entire video can be calculated and regions where the heat map exceeds a threshold can be excluded. The number of line profiles can also be varied. In general, using more lines increases the robustness of the algorithm at the expense of increased processing cycles and running time.

Figure 7:
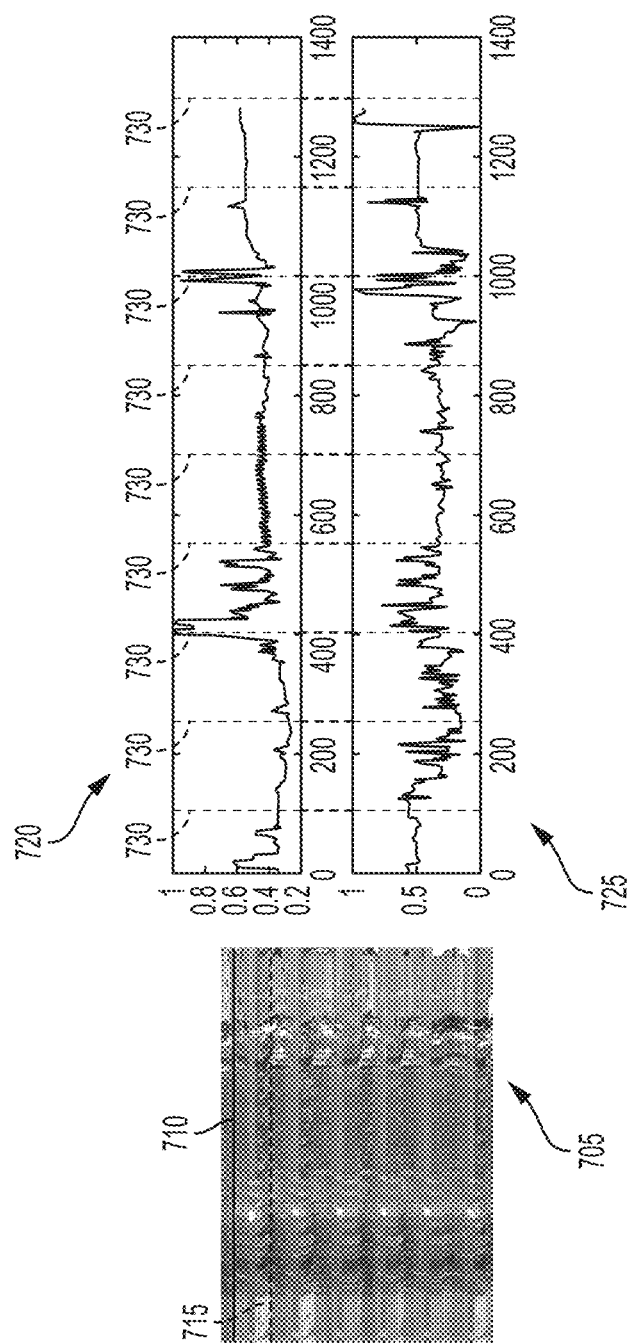
FIG. 7 depicts an exemplary segmentation of a spatiotemporal image in accordance with aspects of the disclosed embodiments.

An optional stacking module 515 can be included in system 500. The stacking module 515 can stack the line profiles from desired frames to form multiple spatiotemporal (ST) images 516, respectively. An exemplary ST image 705 is illustrated in FIG. 7. The purpose of the stacking module 515 is to provide an intuitive representation of the data for the manual identification of a reference time and/or frame. Thus, the stacking module 515 may not be necessary if an automated method is used for identification of the reference time and/or frame.

The stacked line profiles can also be used to visually assess or confirm the effectiveness of the drift correction. In certain embodiments, pixel values are extracted along the identified lines. The pixel values could be line profiles, raw data, local averages, medians, down sampled values, or other processed values associated with the image along the identified lines path. The extracted lines of pixel values can be written as $L_i(x;t)$, where they are formed from pixel values at x, or signal values indexed by x, at a time t corresponding to a given frame, for line i. The i's can index different line profile groups extracted from the given frame t, which corresponds to different spatiotemporal images. The extracted line profiles groups from desired video frames/image sequences are stacked according to the time value, which results in a set of spatiotemporal images. The corresponding spatiotemporal images can be written as $S_i(x;t)$, where i is the line group index.

In order to stabilize the video, the frames have to be registered against a selected reference frame. A reference frame selection module 520 is used to select the reference frame. In one embodiment, the reference frame can be determined by manual selection. In some cases, it may be easiest to select a reference frame using displayed spatiotemporal images 516 provided by stacking module 515. The entire spatiotemporal image may be displayed. Alternatively, only a section of the spatiotemporal image corresponding to one or more line profile groups may be displayed.

In another embodiment, the reference frame can be selected using an algorithm provided in reference frame selection module 520. In the simplest case, the algorithm may simply select the first frame as the reference frame or may randomly select a frame as the reference frame. However, selecting a good reference frame can affect the stabilization result. For example, if the video contains a period that the camera completely shifted away from a region of interest, any reference frame selected from that period will not be able to provide a good reference point for other frames which are outside that period. In general, a good reference frame should contain scene information that is shared by most of other frames. Such scene information may include stationary objects, buildings, or other such objects. Specifically, the algorithm may be configured to maximize the sum of the correlation of the reference frame with all other frames. Accordingly, a potential reference frame can be identified automatically by applying temporal median filtering (or other outlier rejection filtering) on the video sequence over a period of time. The selected reference frame is written as $S_i(x;t_R)$.

A segmenting module 525 can be included in the system. The segmenting module 525 segments each identified line profile group (which may correspond with, for example, the spatiotemporal image rows) into multiple segments. It should be understood that this module is optional and is not required. However, segmentation via the segmenting module 525 may provide improved results in certain embodiments.

Each of the line profile groups can be divided or segmented into multiple sub-segments. The line paths used to create the line profiles, as described in block 420 of method 400, usually contain both stable and dynamic parts of the scene. Direct alignment of a whole line profile group to the reference line profile group is, in some cases, not sufficiently accurate or robust. In other cases, the line profile group, as a whole, may be sufficient. Thus, the segmentation module 525 can be optional in certain embodiments.

In order to determine the misalignment between the test line profile group and the reference line profile group, and in order to be robust to noise due to dynamics in the scene, each line profile can be divided into small segments for further processing. The segments (or sub-segments) can be overlapped or unevenly spaced. The number of segments can vary.

Selecting the length of the sub-segments requires care. If the segments are too long, individual segments will contain both dynamic and stable parts of the scene diminishing the ability to correlate the test line profile group to the reference line profile group. If the segments are too small, then noise due to lighting changes, translation in the perpendicular direction, and other sources will dominate the peak that occurs in the correlation signal at the correct registration offset. In some embodiments, splitting the line into ten segments provides the best trade-off. However, it should be appreciated that the number of segments may be selected according to the specific application. The segment of each row (or other such set of intensity profile) can be written as $S_{ij}(x;t)$, where j indexes the segment.

FIG. 7 illustrates an exemplary segmentation of a spatiotemporal image 705. A selected reference spatiotemporal line is shown by line 710 and test spatiotemporal line is shown by line 715. Line 710 can be aligned with line 715. The plots 720 and 725 show the line profiles of these two rows respectively (plot 720 representing the line profile of the line 710 and plot 725 representing the line profile of the line 715). The dashed black vertical lines 730 give an example of preferable row segmentation.

A registration module 530 is used to perform registration between the segments from all the frames and/or time segments (or just those desired) to the selected reference frame and/or time. Registration refers to line profile group segment alignment between desired frames and the reference frame. Any number of registration methods can be used. In an exemplary embodiment, registration may use maximization of cross-correlation and/or covariance metrics for alignment of the frames with the reference frame. Other effective metrics can also be used, including L0-norm, L1-norm, and L2-norm metrics. Each line profile group segment alignment will produce a camera shift estimate for that line profile segment. Thus, the alignment performed by registration module 530 outputs a shift/offset value 531 for each segment, which is denoted by $D_{ij}(x;t)$. $D_{ij}(x;t)$ results from the alignment between $S_{ij}(x;t)$ and $S_{ij}(x;t_R)$.

Finally, a correction module 535 can be used to calculate the overall horizontal and vertical (or other directional) camera shift information from the registration information between all the segments. Calculating the overall shift requires the collection of all camera shift estimates from the segment alignment of all the line profiles groups. The overall horizontal or vertical (or rotational, etc.) camera shift can be estimated from the information.

The estimation can be made according to any number of simple methods. Such methods may include taking the median or mean value of all the segment based horizontal, vertical, rotational, etc., shifts. More sophisticated known approaches may also be implemented for estimating the shift. The estimate for the frame at time t is written as D(x;t), which is estimated from all $D_{ij}(x;t)$.

The correction module 535 then applies the shift estimates to the original sequence of image frames or video to remove the shift in the data. In one embodiment, the obtained shift information for each frame can be used to remove the shift/drift in the original image sequences or videos to remove or reduce the camera shift/drift in the data. The obtained shift information for each frame can also be used to change the positions of the ROI rather than change the image data directly as mentioned above, so that the corresponding vehicle detection algorithm can correctly determine the occupancy of parked vehicle in proper ROI even under camera shift.

If the amount of camera motion is small and its direction is unknown, it is likely that the motion will be linearly displaced. The methods and systems disclosed herein using row and column line profiles will therefore be most efficient in removing horizontal and vertical shift. If the camera motion causes a translation plus rotation in the scene in a known direction, then picking curved line profiles that follow the expected camera motion will be preferable to align the video data.

In some embodiments, camera drift estimations in horizontal and vertical directions are computed independently. When drift amounts are not excessively large, this is sufficient and yields satisfactory results. In a less common situation, one may apply the methods and systems in a sequential and iterative manner. For example, the drift amount is estimated in the horizontal direction, the vertical lines based on this estimated amount are sampled, and then the drift amount in vertical direction is estimated using the "horizontally corrected" ST images. The steps can be iterated in this fashion after the estimated drift amounts in horizontal and vertical directions have converged or after maximal iterations allowed has been reached.

In yet another embodiment, the methods and systems can be effective for temporal rotation shift correction with the addition of a few minor steps. For example, for each frame rotated (e.g., −1°, −0.5°, 0.5°, 1°) versions can be incorporated. The process can be repeated to find the best horizontal and vertical offsets relative to the reference frame. The combined rotation and offsets that yield the best similarity can be selected (e.g., maximal total correlation). In another embodiment, instead of generating multiple versions of rotated frames and searching only in horizontal and vertical directions, horizontal/vertical lines of reference frames with various angled lines of the target frame can be searched in order to identify the best angle and offsets.

In some applications, there may be vibrations larger than a linear correction can sufficiently fix. These vibrations may cause a larger shift in one part of the scene and a smaller shift in another part of the scene. For example, if a vibration caused a rotation about the lower left corner of the field of view, then there would be little motion near the lower left corner and much larger motion near the upper right corner. Typically, for cameras mounted to the masts of the trailer, these vibrations remain the same throughout the length of the video.

Automatic determination of this offset is possible by calculating the optical flow field between two quiescent frames. Candidate frames can be chosen from the vertical and horizontal spatiotemporal images, where a large enough registration error can be found to give a good signal. The magnitude of the optical flow vectors may be fitted to a functional form to reduce noise. From the optical flow vector field, selected field lines are used as the lines to build the spatiotemporal maps rather than horizontal and vertical line profiles or rotated line profiles. Once the set of field lines are selected, the offset between the test frame and the reference frame is determined by the registration module 530 to give the registration error along each field line. Corrections outside the field lines are determined by interpolation between the adjacent field lines.

Accordingly, a method and system for video frame alignment, as disclosed herein, provides a fast and robust solution for long-term outdoor videos. The systems and methods provide extremely fast results (10 to 20 minutes for a week long data sequence), are robust to big scene dynamics, are good for outdoor videos, do not induce drift accumulations, and are desired for long duration videos.

Based on the foregoing, it can be appreciated that a number of embodiments, preferred and alternative, are disclosed herein. For example, in one embodiment, a method for video frame alignment comprising collecting video data comprising at least two video frames, extracting a line profile along at least one line path in each of the at least two video frames, selecting one of the at least two video frames as a reference video frame, aligning at least one of the at least one line profiles with the line profile in the reference video frame, translating each of the at least two video frames according to the corresponding line profile alignments, and removing a camera shift from the at least two video frames according to the translation and alignment of the at least one of the at least one line profiles with the line profile in the reference video frame.

In an embodiment, the method further comprises stacking the at least one line profiles in each of the at least two frames forming at least one spatiotemporal image. In another embodiment, the method further comprises segmenting each of the at least one line profiles into at least one line profile group segment. The at least one line profile further comprises a sequence of image pixel values sampled from a beginning pixel of the line path to an end pixel of the line path.

In an embodiment, selecting one of the at least two video frames as a reference video frame further comprises identifying one of the at least two video frames containing a plurality of scene features shared with the at least one other of the at least two video frames, and selecting the identified one of the at least two video frames as a reference video frame according to the stacked spatiotemporal image.

The line path comprises at least one of a horizontal line, a vertical line, a diagonal line, a curved line, a line along an expected drift direction in the video data, and a line along a path with a stable background scene content in the at least two video frames.

In another embodiment, aligning at least one of the at least one line profiles with the line profile in the reference video frame further comprises finding a shift value that maximizes a cross-correlation of the at least one line profile with the line profile in the reference video frame, finding a shift value that maximizes a covariance of the at least one line profile with the line profiles in the reference video frame, and outputting the shift value for each of the at least one line profiles.

In an embodiment, removing a camera shift from the at least two video frames further comprises collecting all the shift values for each of the at least one line profiles, calculating an overall camera shift according to the shift values for each of the at least one line profiles, and adjusting the collected video data comprising at least two video frames to remove the overall camera shift in the collected video data.

In yet another embodiment, a system for video frame alignment comprises a video acquisition module configured to collect image data comprising at least two image frames; a processor; and a computer-usable medium embodying computer code, the computer-usable medium being coupled to the processor, the computer code comprising non-transitory instruction media executable by the processor configured for: extracting a line profile along at least one line path in each of the at least two video frames, selecting one of the at least two video frames as a reference video frame, aligning at least one of the at least one line profiles with the line profile in the reference video frame, translating each of the at least two video frames according to the corresponding line profile alignments, and removing a camera shift from the at least two video frames according to the translation and alignment of the at least one of the at least one line profiles with the line profile in the reference video frame.

In an embodiment, the computer code comprising non-transitory instruction media executable by the processor is further configured for stacking the at least one line profiles in each of the at least two frames forming at least one spatiotemporal image. The computer code comprising non-transitory instruction media executable by the processor is further configured for segmenting each of the at least one line profiles into at least one line profile group segment. In an embodiment, the at least one line profile further comprises a sequence of image pixel values sampled from a beginning pixel of the line path to an end pixel of the line path.

In another embodiment, selecting one of the at least two video frames as a reference video frame further comprises identifying one of the at least two video frames containing a plurality of scene features shared with the at least one other of the at least two video frames, and selecting the identified one of the at least two video frames as a reference video frame according to the stacked spatiotemporal image.

In an embodiment, line path comprise at least one of a horizontal line, a vertical line, a diagonal line, a curved line, a line along an expected drift direction in the video data, and a line along a path with a stable background scene content in the at least two video frames.

In another embodiment, aligning at least one of the at least one line profiles with the line profile in the reference video frame further comprises finding a shift value that maximizes a cross-correlation of the at least one line profile with the line profile in the reference video frame, finding a shift value that maximizes a covariance of the at least one line profile with the line profiles in the reference video frame, and outputting the shift value for each of the at least one line profiles.

In an embodiment, removing a camera shift from the at least two video frames further comprises collecting all the shift values for each of the at least one line profiles, calculating an overall camera shift according to the shift values for each of the at least one line profiles, and adjusting the collected video data comprising at least two video frames to remove the overall camera shift in the collected video data.

In yet another embodiment, an apparatus for video frame alignment comprises: a video acquisition module for collecting video data comprising at least two video frames; a processor; a computer-usable medium embodying computer code, the computer-usable medium being coupled to the processor, the computer code comprising non-transitory instruction media executable by the processor; a line profile extraction module which extracts a line profile along at least one line path in each of the at least two video frames; a reference frame selection module which selects one of the at least two video frames as a reference video frame; a registration module which aligns at least one of the at least one line profiles with the line profile in the reference video frame; a correction module for translating each of the at least two video frames according to the corresponding line profile alignments to thereby remove a camera shift from the at least two video frames according to the translation; and alignment of the at least one of the at least one line profiles with the line profile in the reference video frame.

In another embodiment, the apparatus further comprises a segmenting module which segments each of the at least one line profiles into a plurality of segmented line profiles. In an embodiment, a stacking module stacks the at least one line profiles in each of the at least two frames forming at least one spatiotemporal image.

In another embodiment, the line path comprise at least one of: a horizontal line, a vertical line, a diagonal line, a curved line, a line along an expected drift direction in the video data, and a line along a path with a stable background scene content in the at least two video frames.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for video frame alignment comprising:
   collecting video data comprising at least two video frames;
   extracting a line profile along at least one line path in each of said at least two video frames;
   selecting one of said at least two video frames as a reference video frame;
   aligning at least one of said at least one line profiles with said line profile in said reference video frame;
   translating each of said at least two video frames according to said corresponding line profile alignments; and
   removing a camera shift from said at least two video frames according to said translation and alignment of said at least one of said at least one line profiles with said line profile in said reference video frame.

2. The method of claim 1 further comprising:
   stacking said at least one line profiles in each of said at least two frames forming at least one spatiotemporal image.

3. The method of claim 2 wherein selecting one of said at least two video frames as a reference video frame further comprises:
   identifying one of said at least two video frames containing a plurality of scene features shared with said at least one other of said at least two video frames; and
   selecting said identified one of said at least two video frames as a reference video frame according to said stacked spatiotemporal image.

4. The method of claim 1 further comprising:
   segmenting each of said at least one line profiles into at least one line profile group segment.

5. The method of claim 1 wherein said at least one line profile further comprises a sequence of image pixel values sampled from a beginning pixel of said line path to an end pixel of said line path.

6. The method of claim 1 wherein said line path comprise at least one of:
   a horizontal line;
   a vertical line;
   a diagonal line;
   a curved line;
   a line along an expected drift direction in said video data; and
   a line along a path with a stable background scene content in said at least two video frames.

7. The method of claim 6 wherein removing a camera shift from said at least two video frames further comprises:
   collecting all said shift values for each of said at least one line profiles;
   calculating an overall camera shift according to said shift values for each of said at least one line profiles; and
   adjusting said collected video data comprising at least two video frames to remove said overall camera shift in said collected video data.

8. The method of claim 1 wherein aligning at least one of said at least one line profiles with said line profile in said reference video frame further comprises:
   finding a shift value that maximizes a cross-correlation of said at least one line profile with said line profile in said reference video frame;
   finding a shift value that maximizes a covariance of said at least one line profile with said line profiles in said reference video frame; and
   outputting said shift value for each of said at least one line profiles.

9. A system for video frame alignment comprising:
   a video acquisition module configured to collect image data comprising at least two image frames;
   a processor; and
   a computer-usable medium embodying computer code, said computer-usable medium being coupled to said processor, said computer code comprising non-transitory instruction media executable by said processor configured for:
      extracting a line profile along at least one line path in each of said at least two video frames;
      selecting one of said at least two video frames as a reference video frame;
      aligning at least one of said at least one line profiles with said line profile in said reference video frame;
      translating each of said at least two video frames according to said corresponding line profile alignments; and
      removing a camera shift from said at least two video frames according to said translation and alignment of said at least one of said at least one line profiles with said line profile in said reference video frame.

10. The system of claim 9 wherein said computer code comprising non-transitory instruction media executable by said processor is further configured for:
    stacking said at least one line profiles in each of said at least two frames forming at least one spatiotemporal image.

11. The system of claim 9 wherein said computer code comprising non-transitory instruction media executable by said processor is further configured for:
    segmenting each of said at least one line profiles into at least one line profile group segment.

12. The system of claim 9 wherein said at least one line profile further comprises a sequence of image pixel values sampled from a beginning pixel of said line path to an end pixel of said line path.

13. The system of claim 9 wherein selecting one of said at least two video frames as a reference video frame further comprises:
    identifying one of said at least two video frames containing a plurality of scene features shared with said at least one other of said at least two video frames; and
    selecting said identified one of said at least two video frames as a reference video frame according to said stacked spatiotemporal image.

14. The system of claim 9 wherein said line path comprise at least one of:
    a horizontal line;
    a vertical line;
    a diagonal line;
    a curved line;
    a line along an expected drift direction in said video data; and
    a line along a path with a stable background scene content in said at least two video frames.

15. The system of claim 9 wherein aligning at least one of said at least one line profiles with said line profile in said reference video frame further comprises:
    finding a shift value that maximizes a cross-correlation of said at least one line profile with said line profile in said reference video frame;
    finding a shift value that maximizes a covariance of said at least one line profile with said line profiles in said reference video frame; and
    outputting said shift value for each of said at least one line profiles.

16. The system of claim 15 wherein removing a camera shift from said at least two video frames further comprises:
    collecting all said shift values for each of said at least one line profiles;
    calculating an overall camera shift according to said shift values for each of said at least one line profiles; and
    adjusting said collected video data comprising at least two video frames to remove said overall camera shift in said collected video data.

17. An apparatus for video frame alignment comprising:
    a video acquisition module for collecting video data comprising at least two video frames;
    a processor;
    a computer-usable medium embodying computer code, said computer-usable medium being coupled to said processor, said computer code comprising non-transitory instruction media executable by said processor;
    a line profile extraction module which extracts a line profile along at least one line path in each of said at least two video frames;
    a reference frame selection module which selects one of said at least two video frames as a reference video frame;
    a registration module which aligns at least one of said at least one line profiles with said line profile in said reference video frame; and
    a correction module for translating each of said at least two video frames according to said corresponding line profile alignments to thereby remove a camera shift from said at least two video frames according to said translation and alignment of said at least one of said at least one line profiles with said line profile in said reference video frame.

18. The apparatus of claim 17 further comprising:
a segmenting module which segments each of said at least one line profiles into a plurality of segmented line profiles.

19. The apparatus of claim 17 further comprising:
a stacking module which stacks said at least one line profiles in each of said at least two frames forming at least one spatiotemporal image.

20. The apparatus of claim 17 wherein said line path comprise at least one of:
a horizontal line;
a vertical line;
a diagonal line;
a curved line;
a line along an expected drift direction in said video data; and
a line along a path with a stable background scene content in said at least two video frames.

\* \* \* \* \*